March 29, 1949.  H. LIEBERHERR  2,465,735
APPARATUS FOR SUPERVISING THE RUNNING STATE OF
THE PISTON OF RECIPROCATING MACHINES
Filed Oct. 26, 1945
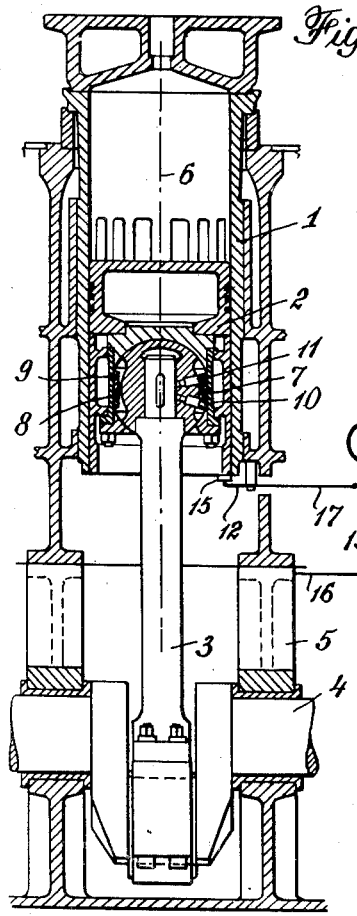
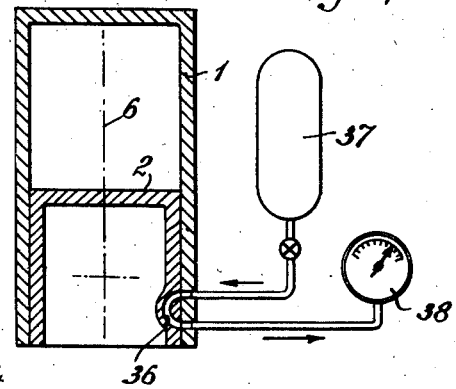
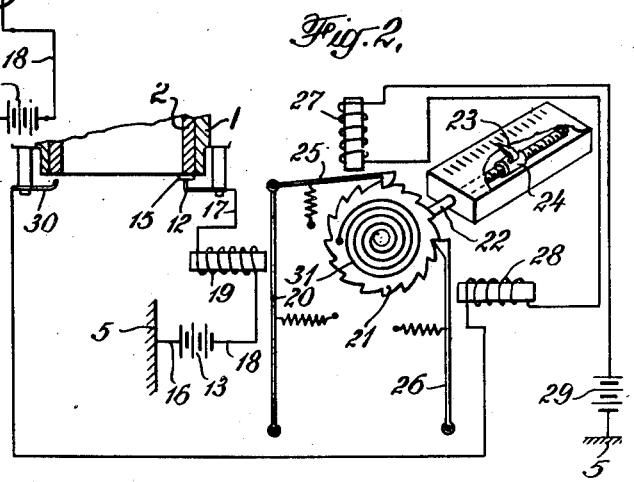
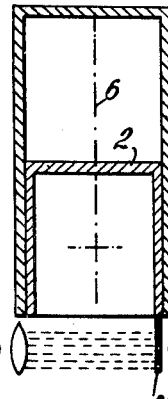
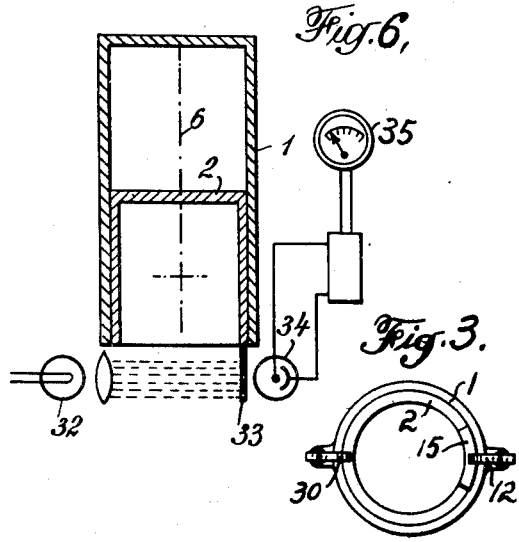
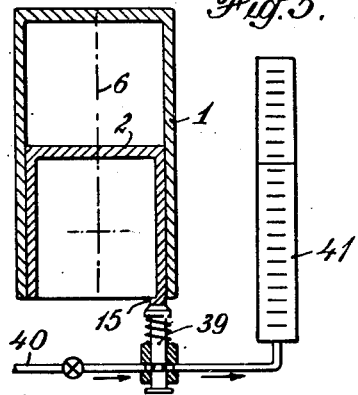
INVENTOR
HANS LIEBERHERR
BY
Pennie, Davis, Marvin & Edmonds
ATTORNEYS Patented Mar. 29, 1949

2,465,735

UNITED STATES PATENT OFFICE 2,465,735

APPARATUS FOR SUPERVISING THE RUNNING STATE OF THE PISTON OF RECIPROCATING MACHINES

Hans Lieberherr, Winterthur, Switzerland, assignor to Sulzer Freres, Societe Anonyme, Winterthur, Switzerland Application October 26, 1945, Serial No. 624,794
In Switzerland April 30, 1945

4 Claims. (Cl. 177—311)

The invention relates to apparatus for supervising the running state of the piston of a reciprocating machine while it is working, and to a reciprocating machine embodying this apparatus. The apparatus according to the invention consists in the combination of means by which the piston is given an on-positive rotary motion around its axis of symmetry and means by which this rotary motion is indicated outside the machine. A reciprocating machine suitable for carrying out this method may be fitted with a device for giving the piston a non-positive rotary motion around its axis of symmetry according to U. S. Patent 2,232,802 and further any of a variety of indicating devices influenced by the piston and making the rate of this rotary motion apparent while the machine is working.

When reciprocating machines are working, at the most the part of the piston running surface which comes out of the cylinder, can be directly supervised; the part of the piston which does not come out of the cylinder, however, cannot be supervised. It is therefore possible for damage to occur on the running surface of the piston or on the running surface of the cylinder while the machine is at work which only makes itself perceptible when it can no longer be remedied. The increase in frictional forces arising from the outset of any such damage is so exceedingly small in comparison with the working forces transmitted by the cylinder and the normal forces acting on its surfaces that this change in frictional force can scarcely be perceived from the working of the machine. If, however, the piston is given a non-positive rotary motion about its axis of symmetry, for instance by frictional drive, the forces which cause such a rotary motion will not be influenced by the working or combustion forces. On the other hand, if damage starts on the running surfaces between piston and cylinder, the forces necessary for maintaining the rotary motion will quickly increase. But since the drive is non-positive, the rotary motion will be slowed down or even completely stopped. When the rotary motion has completely stopped, axial grooves will start in the running surfaces of the piston and of the cylinder, causing the piston and cylinder to be damaged or even rendered quite unserviceable within a short time. If the rotary motion of the piston is made visible or perceptible outside the machine, the decrease in the speed of rotation will show that damage has started. In this way, measures to eliminate it can be applied in time.

A non-positive rotary motion may be given to the piston for instance by means of two expanding rings which are caused to execute reciprocating rotary motions about their axes of symmetry in a direction opposite to the oscillating motions of the connecting rod, in the manner fully illustrated and described in U. S. Patent 2,232,802. The piston is then carried round each time by the momentarily expanded ring by means of friction, whilst the ring momentarily reduced in circumference and diameter slides over the frictional surface with less resistance. In this way, the piston is caused to rotate further step by step in the direction of rotation of the expanding ring which is at the moment affected. Since the worsening of the running condition of the piston occurs simultaneously with the increase in the friction of the piston on the cylinder sliding surface, the frictional forces between the expanding rings and the piston are no longer sufficient to maintain the rotary motion at the same speed. From the slowing down of the rotary motion— which may be perceived by means of the indicating device—an idea may be obtained of the state of the running surfaces.

The rotary motion of the piston may be indicated by means of a signal transmitter arranged on the piston or on some constructional part rotating with the piston. Such a device may transmit the signals by mechanical, optical, hydraulic, acoustic or electrical means. The electrical signals may be transmitted through contacts, by inductive, or by capacitative means. These transmitters may give signals after completing a full revolution, part of a revolution, or several revolutions. It is, moreover, also possible to make a simple mark on the piston, for instance by means of paint, thus allowing the rotary motion of the piston to be directly observed and supervised when the machine is working.

The indicating device may for example have a switch which is influenced by a projection on the piston only during a part of its revolution, thereby closing an electric circuit. This electric circuit may then influence a perceptible index which indicates the closing or opening of the electric circuit. It may for instance be provided with a lamp, which the rotation of the piston causes to light intermittently. The indicating device may also be provided with a counting mechanism showing the number of revolutions made in a certain interval of time. The counting mechanism may then also influence an alarm device, which comes into action when the speed of rotation of the piston falls below the permissible minimum.

The indicating device may also include a screen connected to the piston, which intermittently screens off radiation from a source of radiation. It may for instance intermittently interrupt a ray of light which influences a photoelectric cell. The indicating device may also be constructed as a flow-through member, which allows a pressure medium to flow through during a part of the piston rotation.

Various novel combinations of apparatus embodying this invention are illustrated diagrammatically in the accompanying drawings in which:

Fig. 1 shows a reciprocating engine in which the piston is given a non-positive rotary motion around its axis of symmetry combined with an indicator lamp circuit to make this rotation perceptible;

Fig. 2 shows the inclusion of a counting mechanism as the indicating device in the combination of Fig. 1;

Fig. 3 is a bottom end view of the cylinder, piston and associated contacts illustrated in Fig. 2;

Figs. 4 and 5 show the inclusion of flow-through members as the indicating devices in embodiments of the invention; and Fig. 6 shows the inclusion of a radiation interrupter as the indicating device in another embodiment of the invention.

The reciprocating engine shown in Fig. 1 has a cylinder 1, a piston 2, a connecting rod 3, a crank shaft 4 and a supporting structure 5. To improve the running qualities of the piston 2, a flexibly acting ratchet device, built substantially according to the disclosure of U. S. Patent 2,232,802, imparts an additional rotary motion to the piston 2 about its longitudinal axis 6. This device consists of a cylindrical bushing 7, rigidly connected to the piston 2, two expandable split rings 8 and 9, and control pins 10 and 11 each engaging in an opening in one of the expandable split rings near the split therein. The control pins 10 and 11 make a reciprocating motion substantially in the planes of the rings 8 and 9, respectively, because of their seating in the oscillating ball-shaped head of the connecting rod 3. This reciprocating motion causes the rings 8 and 9 to make limited rotary motions about the piston axis 6, of small angular extent and in contrary direction to each other. But because rings 8 and 9 are split, that ring expands, which is pressed by the control pin in the direction to open the slot, and the other ring necessarily contracts, its control pin pressing in the direction to close the slit. The ring which expands adheres to the cylindrical bushing 7 and thereby imparts a rotary motion to the piston 2, whilst the ring which contracts slides over the inner surface of the cylindrical bushing 7. When the oscillating movement of the connecting rod reverses, the operating rings 8 and 9 exchange their roles, the ring formerly expanded being contacted, whilst the other ring is now expanded. Since, however, at the same time also the direction of the rotary motions of the rings are reversed, the piston is now rotated further by the ring which is now expanded in the same direction as previously. Therefore, in consequence of transmission of the oscillating motion of the connecting rod 3 through the yieldingly-acting operating device, the piston makes an intermittent rotary motion. The rotary motion thus imparted, as explained in U. S. Patent 2,232,802, improves the running qualities of the piston very considerably. Not only the sliding surfaces between the connecting rod 3 and the piston, but also the piston and cylinder sliding surfaces, are protected against seizing. In the course of service, the piston acquires a highly-polished fine sliding surface whose hardness increases in the course of time.

The rotary motion of the piston is thus very important for the reliability of service. Should this rotary motion cease because of troubles, especially with the yielding drive, it is impossible for this to be perceived from outside without any auxiliary device, since the engine is covered-in on all sides. An indicating device influenced by the piston according to this invention is combined with a piston having such a non-positive rotary motion about its axis of symmetry to make rotary motion perceptible during service.

In the combination illustrated in Fig. 1, the indicating device has a switch contact 12, a source of current 13 and an incandescent lamp 14. The switch contact 12 is only touched by a projecting piece 15 on the piston during a part of the rotation of the piston in the region of the lower dead centre. This closes an electric circuit, consisting of the source of current 13, cable 16, supporting structure 5, piston 2, projection 15, switch contact 12, cable 17, lamp 14 and cable 18, thus causing the lamp 14 to light. Since the projection 15 is only on a small part of the periphery of the piston, the lamp 14 lights up but a short time once during each rotation of the piston. The speed of rotation of the piston can also be determined from the number of times the lamp lights up. If the speed falls below an admissible minimum, there is danger of damage occurring to the running gear. The lubrication and other operating conditions of the piston must then be inspected. Since only a slight increase in the coefficient of friction between the engaged surfaces of the piston 2 and the cylinder 1 is sufficient to slow down or stop the rotary motion of the piston, the control device enables not only the loss of the beneficial effects directly derived from the rotary motion of the piston itself to be detected and corrected, but, also, enables a serious breakdown of the lubrication between piston and cylinder to be anticipated and the major structure damage attendant upon a piston seizure to be prevented.

Instead of causing an incandescent lamp to light, the current impulses could also be used to influence a counting mechanism as shown in Fig. 2.

In the electric circuit consisting of the cable 16, supporting structure 5, projecting pin 15, switch contact 12, cables 17 and 18 and source of current 13, an electro-magnet 19 is fitted, which attracts an armature 20 at each current impulse. This armature then moves the ratchet wheel 21 one notch further. The spindle 22 connected to the ratchet wheel 21 causes the nut 24 to move together with the pointer 23 attached to it. The ratchet lever 25 and the pawl 26 are raised from time to time by the electro magnets 27 and 28. These magnets are for this purpose inserted in an electric circuit which includes the source of current 29 and the switch contact 30. During each rotation of the piston, this switch contact closes the electric circuit when contact is made with the projecting piece 15, so that the ratchet lever 25 and the pawl 26 are raised; the ratchet wheel 21 is free and is turned back again by the spring 31 which has previously been given tension. The nut 24 and the pointer 23 then come back to the initial position. When the piston is rotating sufficiently, the projecting piece 15 comes into contact only during a certain time with the switch contact 12. The nut 24 and the pointer 23 are then screwed along only a few divisions and afterwards led back again to their initial positions. But if the speed of the piston decreases to an inadmissible extent, the projection 15 touches the switch contact 12 a greater number of times in one revolution, so that the nut 24 and the pointer 23 are then screwed through a long distance before being again led back to their initial positions. On the scale over which the pointer 23 passes, a mark can be made which corresponds to the permissible speed of rotation of the piston. If the pointer goes beyond this mark, the speed of the piston is too low.

With the indicating device illustrated in Fig. 3, the rays from the incandescent lamp 32 are periodically interrupted by means of a screen 33 connected to the piston 2. Twice during one revolution of the piston, the screen will interrupt the rays entirely or partly, during a few strokes at the lower dead centre. The photoelectric cell 34 is then influenced only to a reduced extent, which can be perceived from the galvanometer 35. From the number of alterations in the strength of the current as shown by the galvanometer, the number of rotations of the piston can be determined.

The piston 2 of the machine illustrated in Fig. 4 has a flow-through member formed as a passage 36, which, during a small part of the rotation of the piston, allows a pressure medium to flow through from the container 37 to the pressure indicating appliance 38. An increase in the indicated pressure shows each time that the piston 2 has rotated once about its axis 6.

The machine shown in Fig. 5 has a flow-through member designed as a slide valve 39, by means of which a pressure means, for instance a liquid, can be allowed to flow from the supply pipe 40 to the indicating glass 41. The slide valve is opened several times during one revolution of the piston by the projecting piece 15 at the lower dead centre of the piston. From the number of intermittent increases in height of the liquid in the indicating glass 41, the speed of rotation of the piston can be determined. The flow-through of liquid can also be shown by a drain device with visible outlet. The indicating valve 41 may for instance have an outlet opening, so that the liquid does not rise intermittently but can flow away again after each increase.

Instead of influencing the electric indicating devices by closing an electric circuit, they could also be influenced by interrupting a circuit. The invention is not confined to reciprocating internal combustion engines; it may also be adopted for other reciprocating machines, for example compressors, pumps, and steam engines.

I claim:

1. In combination a cylinder, a piston reciprocating in said cylinder, means operated by the reciprocation of said piston for imparting to said piston nonpositive rotary motion about its axis of symmetry and means responsive to said rotary motion for positively indicating the rate thereof, and thereby supervising both the reciprocating and the rotary motions of said piston.

2. The combination of claim 1 in which the indicating means responsive to the rotary motion of the piston include means for transmitting a series of signals to the outside of the machine during a predetermined arc of each revolution of said rotary motion, the single signals making up the said series being periodic with the reciprocating motion of said piston.

3. The combination of claim 2 in which the indicating means responsive to the rotary motion of the piston include a projection on the piston extending a predetermined portion of the circumference thereof and an electric circuit including a source of current, a perceptible indicator actuated by the passage of current in the circuit and a switch closing said circuit when said projection is passing through a predetermined segment of its path of rotation and a predetermined limited portion of its path of reciprocation.

4. The combination of claim 3 in which the indicating means responsive to the rotary motion of the piston include a projection on the piston extending a predetermined portion of the circumference thereof, a first electric circuit including a source of current, a first solenoid and a first switch actuated by said projection during a portion of the arc of rotation of said piston only, a spring biased ratchet wheel, a ratchet operating lever actuating said wheel against its spring bias and arranged as the armature of said first solenoid, a pawl engaging said ratchet wheel and holding it against its spring bias, a second electric circuit including a second switch actuated by said projection during a further separate part of the arc of rotation of said piston only, a second solenoid arranged to withdraw said pawl from engagement with said wheel when energized and a third solenoid arranged to withdraw said ratchet actuating lever from engagement with said wheel when energized, and indicating means actuated by said wheel for indicating at any time the amount of rotary motion which has been stored in said wheel against its spring bias.

HANS LIEBERHERR.

REFERENCES CITED

The following references are of record in the file of this patent:

UNITED STATES PATENTS

| Number | Name | Date |
|---|---|---|
| 475,066 | Ricketson | May 17, 1892 |
| 2,130,453 | Bone | Sept. 20, 1938 |
| 2,333,210 | Stern | Nov. 2, 1943 |